(12) United States Patent
Soni (10) Patent No.: US 12,493,652 B2
(45) Date of Patent: Dec. 9, 2025

(54) DATA COMPRESSION USING SORT-BASED ENCODER

(71) Applicant: Dell Products L.P., Round Rock, TX (US)

(72) Inventor: Vinay Soni, Kolkata (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/622,023

(22) Filed: Mar. 29, 2024

(65) Prior Publication Data

US 2025/0307316 A1 Oct. 2, 2025

(51) Int. Cl.
*G06F 16/901* (2019.01)
*G06F 7/08* (2006.01)

(52) U.S. Cl.
CPC ............ *G06F 16/9027* (2019.01); *G06F 7/08* (2013.01)

(58) Field of Classification Search
CPC .............................. G06F 16/9027; G06F 7/08
USPC ........................ 707/693, 736, 741, 752, 797
See application file for complete search history.

(56) References Cited

U.S. PATENT DOCUMENTS

| 10,909,131 | B1 * | 2/2021 | Graham | ................ | G06F 16/901 |
| 2016/0098439 | A1 * | 4/2016 | Dickie | .................. | G06F 16/215 707/693 |
| 2017/0351731 | A1 * | 12/2017 | Brosch | ................ | G06F 16/2358 |
| 2018/0234707 | A1 * | 8/2018 | Pujia | .................. | H04N 21/4227 |
| 2024/0345851 | A1 * | 10/2024 | Du Preez | ........... | G06Q 10/0635 |

OTHER PUBLICATIONS

Wikipedia contributors, Huffman coding, available at: https://en.wikipedia.org/w/index.php?title=Huffman_coding&oldid=1209911693. (last visited Mar. 29, 2024), last updated Feb. 24, 2024.
Wikipedia contributors, Merge sort, available at: https://en.wikipedia.org/w/index.php?title=Merge_sort&oldid=1215151459 (last vistied Mar. 29, 2024) last updated Mar. 23, 2024.
Wikipedia contributors, ZIP (file format), available at: https://en.wikipedia.org/w/index.php?title=ZIP_(file_format) &oldid=1212091339 (last visted Mar. 29, 2024), last updated Mar. 6, 2024.

(Continued)

*Primary Examiner* — Phong H Nguyen
(74) *Attorney, Agent, or Firm* — Ryan, Mason & Lewis, LLP (57) ABSTRACT

Methods, apparatus, and processor-readable storage media for data compression using a sort-based encoder are provided herein. An example method includes generating, for a sequence of data, a tree data structure comprising nodes including a set of leaf nodes. Each of at least a subset of the leaf nodes represents a corresponding data symbol and includes index values of instances of the corresponding data symbol in the sequence of data. The method includes applying a sort-based encoding process that merges the index values across the nodes. The sort-based encoding process includes merging the index values corresponding to a given set of the nodes and encoding selection information indicating which node the index value currently being merged belongs to and scaling information corresponding to weights maintained for the given set of nodes. A compressed version of the sequence of data is generated based on a result of the sort-based encoding process.

20 Claims, 8 Drawing Sheets

(56) References Cited

OTHER PUBLICATIONS

Wikipedia contributors, Lempel-Ziv-Welch, available at: https://en.wikipedia.org/w/index.php?title=Lempel%E2%80%93Ziv%E2%80%93Welch&oldid=1194905845 (last visited Mar. 29, 2024), last updated Jan. 11, 2024.

Wikipedia contributors. Brotli. available at: https://en.wikipedia.org/w/index.php?title=Brotli&oldid=1212784706 (last accessed Mar. 29, 2024), last updated Mar. 9, 2024.

* cited by examiner

DATA COMPRESSION USING SORT-BASED ENCODER

BACKGROUND

Data compression techniques are often employed to reduce the number of bits used to represent data (e.g., files). Such techniques can be used to save storage space and/or to reduce an amount of data transferred over one or more networks, for example.

SUMMARY

Illustrative embodiments of the disclosure provide techniques for data compression using a sort-based binary encoder. An exemplary computer-implemented method includes generating, for a sequence of data, a tree data structure comprising a plurality of nodes, wherein the plurality of nodes comprises a set of leaf nodes, wherein each of at least of a subset of the leaf nodes represents a corresponding data symbol and comprises index values of instances of the corresponding data symbol in the sequence of data. The method includes applying a sort-based encoding process that merges the index values across the plurality of nodes, where the sort-based encoding process comprises merging the index values corresponding to a given set of nodes in the plurality of nodes and encoding (i) selection information indicating which node, in the set of nodes, the index value currently being merged belongs to and (ii) scaling information corresponding to weights maintained for the given set of nodes. The method also includes generating a compressed version of the sequence of data based at least in part on a result of the sort-based encoding process.

Illustrative embodiments can provide significant advantages relative to conventional data compression techniques. For example, technical problems associated with compressing different types of raw data (e.g., data having a larger bit size, data having unique permutations, data having a high degree of sortedness, etc.) are mitigated in one or more embodiments by implementing a sort-based binary encoder framework that extracts and compresses a distribution of data symbols in a data source by sorting the indexes of the data symbols, and then encoding the distribution information.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

The generation and consumption of diverse data types, including text, images, audio, and video, have grown exponentially. This necessitates efficient data compression techniques that preserve data integrity while enabling faster storage and/or transmission. Traditional compression methods often face limitations in handling, for example, various data types and achieving lossless reconstruction.

A data compressor and/or a data encoder generally include one or more programs that are configured to encode symbols from a data source (e.g., a file) into an output having a length that approaches some lower bound (e.g., as defined by a Shannon Source Coding Theorem). This lower bound can represent a number of bits required to encode a source of data, and any value below this number of bits is considered to be a loss of at least some information.

According to some embodiments, a distribution of data symbols in a data source is compressed and extracted by sorting the indexes or positions of the symbols, and then encoding the distribution information. In at least one embodiment, the sorting can be performed using weights, as opposed to spending one bit for each comparison in the comparison cycle. The encoding of the states of such weights (which correlates with its distribution) can be performed using a numerical binary encoder in order to provide a compact representation of the source. In this context and elsewhere herein, the term "numerical binary encoder" generally refers to a type of encoder that does not depend on, for example, a frequency table and/or a symbol dictionary. The numerical binary encoder, in some examples, includes a constant time encoder (e.g., where the time is independent of the input data).

Figure 1:
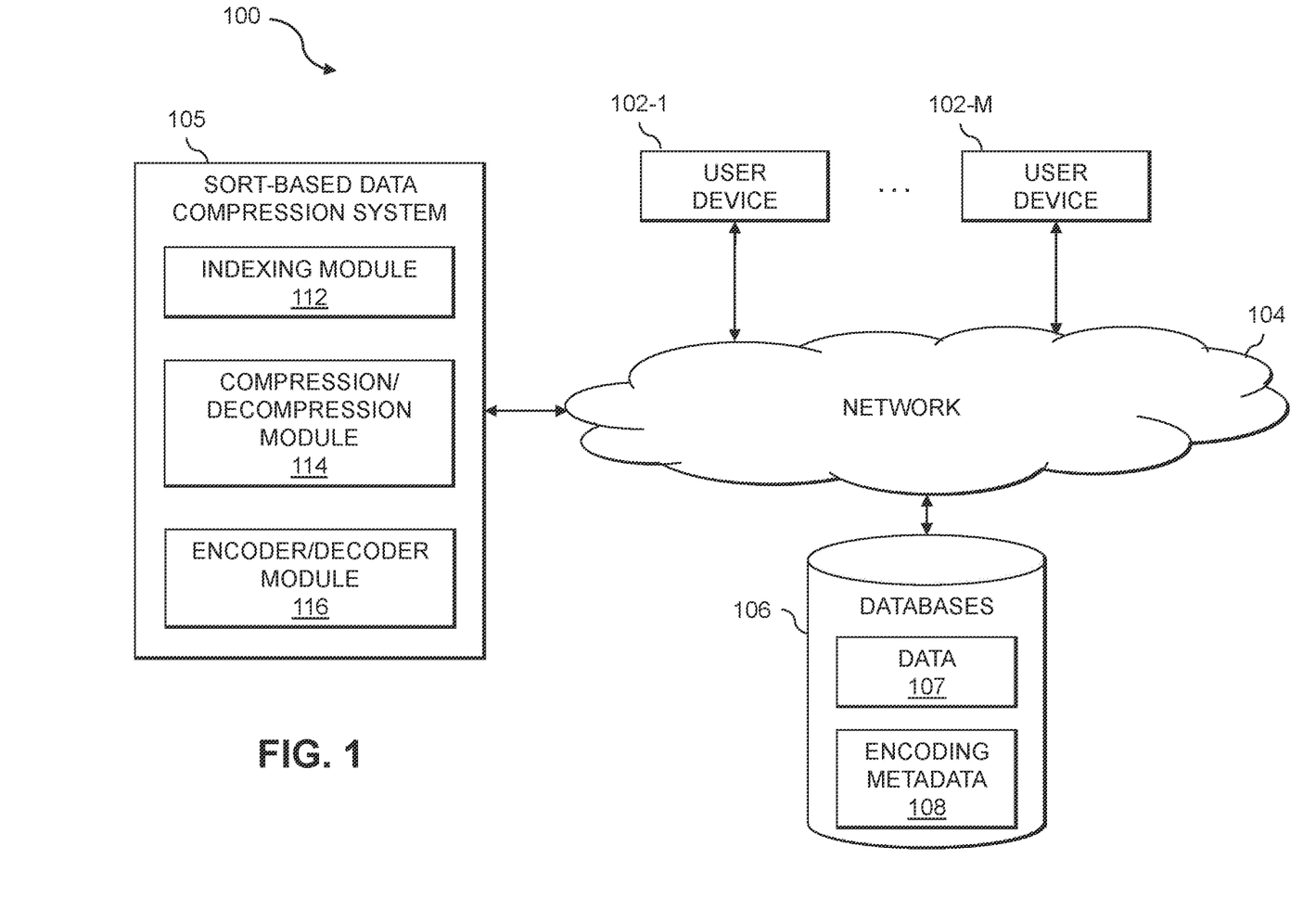
FIG. 1 shows an information processing system configured for data compression using a sort-based binary encoder in an illustrative embodiment.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a sort-based data compression system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the sort-based data compression system 105 can have one or more associated databases 106 configured to store data 107, such as encoded data compressed by the sort-based data compression system 105 and/or data to be compressed by the sort-based data compression system 105. In some embodiments, the one or more databases 106 can also include encoding metadata 108 to enable compression and/or decompression of the data 107, for example. In some embodiments, the encoding metadata 108 can include encoding selection information and/or encoding weight information, as described in more detail elsewhere herein.

An example database 106, such as depicted in the present embodiment, can be implemented using one or more storage systems associated with the sort-based data compression system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the sort-based data compression system 105 are one or more input-output devices, which illustratively comprise keyboards, displays or other types of input-output devices in any combination. Such input-output devices can be used, for example, to support one or more user interfaces to the sort-based data compression system 105, as well as to support communication between sort-based data compression system 105 and other related systems and devices not explicitly shown.

Additionally, the sort-based data compression system 105 in the FIG. 1 embodiment is assumed to be implemented using at least one processing device. Each such processing device generally comprises at least one processor and an associated memory, and implements one or more functional modules for controlling certain features of the sort-based data compression system 105.

More particularly, the sort-based data compression system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the sort-based data compression system 105 to communicate over the network 104 with the user devices 102, and illustratively comprises one or more conventional transceivers.

The sort-based data compression system 105 further comprises an indexing module 112, a compression/decompression module 114, and an encoder/decoder module 116.

According to some embodiments, the indexing module 112 is configured to process input data (e.g., corresponding to at least a portion of the data 107) to extract information relating to positions (e.g., index values) of instances of different data symbols in the input data. In this context and elsewhere herein, the term "data symbol" is intended to be broadly construed so as to encompass, for example, a data unit used in a given encoding scheme. For example, a given data symbol can represent one or more portions of data, such as one or more bits, one or more numbers, one or more letters, and/or other types of data.

In some embodiments, one or more encoding standards can specify a correspondence between bit patterns in the input data and a plurality of data symbols, such as one or more character encoding standards (e.g., an American Standard Code for Information Interchange (ASCII) standard and/or a Unicode standard), one or more image encoding standards (e.g., a Joint Photographic Experts Group (JPEG) standard, a PNG (Portable Network Graphics) standard, a Graphics Interchange Format (GIF) standard), one or more audio encoding standards (e.g., an MPEG-1 Audio Layer III (MP3) standard) and/or one or more video encoding standards (e.g., an Advanced Video Coding standard such as H.264/AVC), as non-limiting examples.

Figure 2:
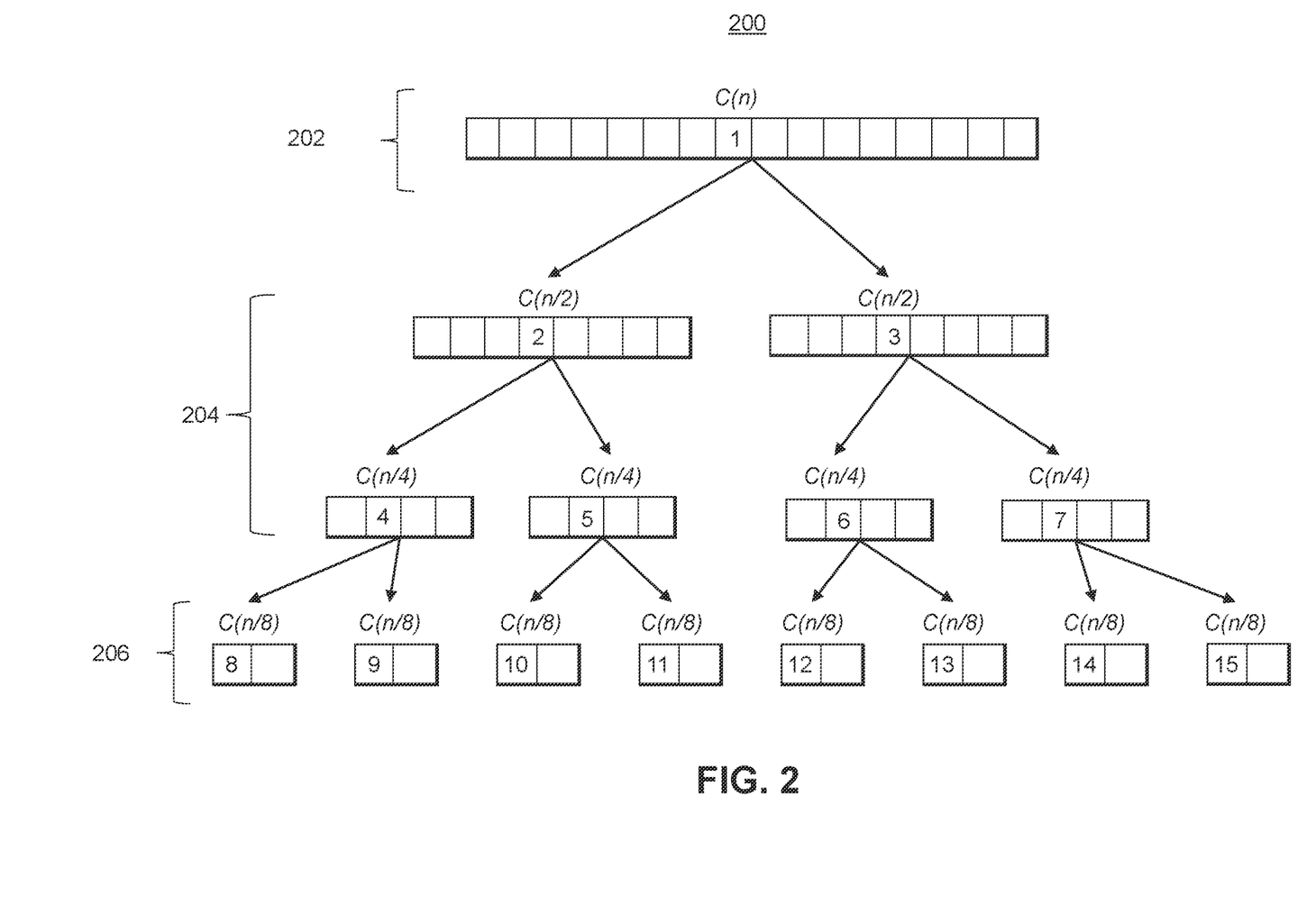
FIG. 2 shows an example of a tree data structure in an illustrative embodiment.

According to some embodiments, the compression/decompression module 114 can be configured to generate a data structure (e.g., a tree data structure) comprising a plurality of nodes. FIG. 2 shows an example of a tree data structure 200 in an illustrative embodiment. In this example, the tree data structure 200 is in the form of a binary tree data structure and uses 1-based indexes for the nodes. More specifically, the tree data structure 200 comprises a top level 202 having a root node with an index of 1, two intermediate node levels 204 having nodes indexed 2 to 7, and a bottom level 206 having a plurality of leaf nodes with indexes 8 to 15. It is to be appreciated that in other embodiments the tree data structure 200 can have a different tree indexing scheme, a different number of levels, and/or a different number of nodes depending on the implementation and the data that is to be encoded. As an example, the tree data structure 200 can correspond to a merge sort tree that is used as part of a merge sort process. Typically, a merge sort tree comprises $\log(n)$ levels, where n corresponds to an input length of the number of items (or symbols) to process per $\log(n)$ levels. The cost at each level is equal to $C(n)$, thereby resulting in a time complexity of $O(n \log(n))$. In some examples, the space overhead can be reduced during comparison cycles of the underlying sorting algorithm, as described in more detail herein.

The compression/decompression module 114, in some embodiments, can be configured to compress input data based at least in part on information encoded by the encoder/decoder module 116. For example, the encoder/decoder module 116 can be configured to encode and/or decode information related to the index values (or positions) of the data symbols in the input data (as opposed to the data symbols themselves) and metadata (e.g., selection information and/or weight scaling information), which can be used by the compression/decompression module 114 to improve the efficiency of compressing the input data.

In some embodiments, the encoder/decoder module 116 can comprise a three-stage cyclic encoder which outputs variable length codes in a binary representation in near constant time. The term "variable length codes" in this context generally refers to a representation of data that uses different numbers of bits to encode different symbols, as described in more detail in conjunction with FIG. 3, for example.

The compression/decompression module 114, in some embodiments, can perform a sorting algorithm (e.g., a merge sort algorithm), where weights (e.g., corresponding to nodes in the tree data structure 200) are updated at every $n \log(s)$ comparison, where n is the input length (e.g., a count of data symbols) and s is the symbol set size. The term "symbol set size" in this context and elsewhere herein generally refers to a number of unique symbols in a given dataset.

For example, the compression/decompression module 114 can utilize a breadth first search (BFS) traversal of a merge sort tree, for example. Generally, BFS is a graph traversal algorithm that is configured to explore the vertices of a graph in a breadth-ward motion.

According to some embodiments, the sorting can be performed using the weights, as opposed to spending one bit for each comparison in the comparison cycle. In such embodiments, the weights for a pair of child nodes are used for performing a merge operation. As noted above, the encoder/decoder module 116 can be configured to encode information generated during the sorting process in order to compress the input data. Such embodiments can reduce the cost relative to existing sort-based frameworks, for example.

It is to be appreciated that this particular arrangement of elements 112, 114 and 116 illustrated in the sort-based data compression system 105 of the FIG. 1 embodiment is presented by way of example only, and alternative arrangements can be used in other embodiments. For example, the functionality associated with the elements 112, 114 and 116 in other embodiments can be combined into a single module, or separated across a larger number of modules. As another example, multiple distinct processors can be used to implement different ones of the elements 112, 114 and 116 or portions thereof. In some embodiments, at least one of the user devices 102 and/or the one or more databases 106 can implement at least a part of the sort-based data compression system 105. As another example, at least one of the user devices 102 and/or the one or more databases 106 can each implement a sort-based data compression system 105.

At least portions of elements 112, 114 and 116 may be implemented at least in part in the form of software that is stored in memory and executed by a processor.

It is to be understood that the particular set of elements shown in FIG. 1 for sort-based data compression system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the sort-based data compression system 105 and the one or more databases 106 can be on and/or part of the same processing platform.

An exemplary process utilizing elements 112, 114 and 116 of an example sort-based data compression system 105 in computer network 100 will be described in more detail with reference to, for example, the flow diagrams of FIGS. 3-6.

Typically, sort-based frameworks used for data compression require at least $n \log(n)$ comparisons for random data. If the data is unique and uniformly distributed, then $n \log(n)$ is also the original size of the input data since n is the number of symbols and $\log(n)$ represents the number of bits required per symbol. Thus, if one bit is used for every comparison cycle of the sort-based framework then there is no change in the compressed size (e.g., output file size). Some embodiments described herein can utilize weights for pairs of nodes when performing a merge operation to facilitate a type of run length encoding on index values. Run length encoding generally refers to encoding runs of data as a single data value and count, rather than as the original run. It is noted that the term "runs" in this context and elsewhere herein generally refers to sequences in which the indexes corresponding to a particular node occur as consecutive data elements.

For example, a merge sort tree can have $\log(n)$ levels (n items to process per $\log(n)$ levels), which typically yields minimal compression. At least some embodiments described herein use a hybrid approach, where input data is indexed and put into arrays of same symbols. This can reduce the number of levels in a merge sort operation by a factor of $\log(n)-\log(s)$, where n is the input length and s is the symbol set size. The complexity of such a hybrid approach is $n \log(s)$, where the symbol set size s is significantly less than the input length n.

The path which a given index value takes from the symbol group corresponding to the given index value to a final node, where all the index values of the input data are sorted and in one group due to the convergence of their parent nodes when merged in pairs, collectively infer the data symbol, thereby making symbol identification easier. According to at least one embodiment, the original input data can be reconstructed using a sorted list of indexes, which can be generated in real time (e.g., on the fly), and the encoding metadata. After reversing the merge operation, the total path taken to reach the leaf nodes identifies the corresponding symbol identifier.

Encoding indexes using a sorting framework can result in two types of information. The first type of information is the runs of index values coming from a same child node of a parent node. The other type of information is selection information. The selection information, in some embodiments, comprises a 1-bit binary value that identifies, for every index in a parent node, whether the index value currently being processed is associated with the left child node or the right child node of the parent node. Some embodiments described herein can utilize both types of information in an efficient manner by encoding runs coming from the weights as well as the selection bit for identifying the current state of the weights when any scaling happens. This hybrid approach can be more efficient than just encoding runs from the weights or encoding one bit for each selection for every comparison.

In some embodiments, a binary encoder (e.g., corresponding to the encoder/decoder module 116, for example) can provide a way of encoding that does not rely on statistical properties of the input, is not limited by the symbol set size, and is a near constant-time encoder. In such embodiments, the values to be encoded can be the delta of the states of the weights, which correlate directly to the distribution of the symbols in the source and the file size. Such embodiments can encode necessary information using such a binary encoder. The binary encoder can output variable length binary represented codes, which are a compact representation of an integer, for example. In at least some situations, this can reduce the amount of storage resources needed compared to other encoding techniques, such as a Huffman encoder and/or an arithmetic encoder.

A compressor (such as compression/decompression module 114) can perform a weight scaling function when merging lists (or arrays) of index values for different data symbols. As noted above, each node in a tree data structure can comprise index values for a given data symbol. The objective of the compressor is to increase (e.g., maximize) the weight associated with the child node to which the currently selected index belongs in a reversible manner. The compressor can then output a sorted list of merged indexes to be processed at a next level of the merge sort tree. For the decompressor process, the current target indexes from the sorted list of merged indexes can be divided into two groups, one for each child node of the current node based on which child weight is larger. Subsequently, the weights are readjusted using scaling information, which is used to process the next set of indexes.

For example, a weight scaling function can modify a current weight of the child node to which a selected index belongs in a reversible manner, ensuring that a limited amount of information is required for the reversal. The basic logic of this scaling function ensures that scaling information is only saved when there is a change in the symbol group from which the currently selected index originates. In some embodiments, if the current selected index value is from a same child/symbol group as the previously selected index value, then only the weight value is increased since the same weight is already the largest. However, if the selected index is from a different symbol group, the weights are scaled to make the weights equal, and the scaling information is saved.

As an example, consider the following input sequence: "aababdadcda". The symbols can be indexed into their respective lists (or groups) using a value-to-index transformation as follows:
Group "a"=0, 1, 3, 6, 10
Group "b"=2, 4
Group "c"=8
Group "d"=5, 7, 9.

The lists can be represented as four leaf nodes in a tree data structure. By using the values of data symbols (e.g., the corresponding ASCII values), a complete binary merge sort tree of 2*n−1 nodes can be created, where n is the number of leaf nodes. For example, the maximum value of a symbol in the source code can be determined, and the number of leaf node values in the binary merge sort tree can be equal to a power of two that is greater than the maximum value.

To perform the merge and to update the weights, the index lists can be taken in pairs and can be merged in a BFS manner until a final sorted list of indexes is obtained. Referring again to the example above, group "a" and group "b" can be merged as follows: a∪b=0, 1, 2, 3, 4, 6, 10.

During this merging process, a weight is maintained for each child node (e.g., a first weight for the node on the left and a second weight for the node on the right), which in the example would correspond to groups "a" and "b", respectively. The indexes of each of the groups are then processed sequentially, giving the highest weight to the group the current index belongs to. For example, the indexes can be processed as follows, where the weight of a given group, x, is denoted $W\_x$, the scaling value of a weight is denoted by S_value and the selection bit is denoted by I_value:

Weight "a"=0, Weight "b"=0.
Process Index 0:
  Scale weight of "a":

$$W\_a = 0 + 1 = 1$$

W_b=0
Process index 1:
  Scale weight of "a":

$$W\_a = 1 + 1 = 2$$

W_b=0
Process index 2:
  Scale weight of "b" and "a":

$$W\_b = 0 + 1 = 1$$

S_value=W_a−W_b=2−1=1
  I_value="b"
  W_a=W_b
Process index 3:
  Scale Weight of "a"

$$W\_a = 1 + 1 = 2$$

W_b=1

The process continues for the next set of indexes in the list. It is noted that at every comparison while merging, the objective of the encoder is to make the weight corresponding to the current symbol group the highest weight. This is accomplished, in some embodiments, by manipulating the weights only as much as is needed to maintain reversibility. Also, when processing index 2 in the example above, the symbol group changes from "a" to "b" and the scaling value is determined as: W_a−W_b→W_"larger other weight"−

W_"smaller selected weight"→(2−1)→1. This scaling value corresponds to a distance between the current state of the two weights.

At this stage, the larger weight is assigned the same weight as the smaller weight. The selection bit of which child weight is currently selected (e.g., 0 for left and 1 for right) as well as the delta of their previous state is encoded (e.g., by the encoder/decoder module 116) in a reversible manner, such that the input data can be decompressed by reversing the sorting process.

The initial increment of the weights can help consolidate executions across groups. For example, since the weights are scaled to be equal, the next symbol can come from a different symbol group again without needing to explicitly scale the weight again, thereby compressing single runs. This approach also resembles a hybrid approach since the weights are made equal and the selection bit is saved, as opposed to extracting only the scaling information or only the selection bits. This hybrid approach can help reduce the scaling information required for the next set of indexes and can improve compression.

An example of a decoding process generally includes similar steps as the encoding process, but performed in reverse order. For example, the decoding process can select the correct symbol group for the current index using the largest weight and reversing the scaling to process the next index. Accordingly, the starting index list can be determined based on the scaling information and other metadata. The starting index list can then be used to reconstruct the original input sequence directly in a lossless manner.

An example of pseudocode for the weight scaling function (e.g., performed by the compression/decompression module 114) for compressing input data in accordance with an illustrative embodiment is as follows:

1. Let w_current=weight corresponding to the child data symbol group of the current selected index.
2. Let w_other=weight corresponding to the other symbol group.
3. Increment w_current by 1. This gives w_current a higher probability of being larger than w_other without explicit scaling.
4. Let runCount=0, wherein runCount corresponds to the scaling information.
5. If w_current<=w_other.
   a. Set: runCount=w_other-w_current.
   b. Scale: w_other=w_current
6. If w_current==w_other, encode runCount with the encoder and push the selection/identifier bit into the output bits.
7. Save w_current and w_other back into their corresponding weights and repeat for the next indexes.

It is noted that in the pseudocode above, the comparison at step 5 is performed to ensure that the weight corresponding to the data symbol group of the index value currently being processed (w_current) is larger than the weight corresponding to the other symbol group (w_other).

When decompressing the input data, a reverse weight scaling function can be performed (e.g., performed by the compression/decompression module 114). As a non-limiting example, pseudocode can be used to implement the reverse weight scaling function:

1. Let w_current=Largest weight among two child nodes at any point in a merge sort tree.
2. Let w_other=Weight of the other child node.
3. Let runCount=0.
4. If w_current==w_other
   a. Decode runCount from the decoder
   b. Extract selection/identifier bit
   c. Scale: w_current=w_other; w_other=w_current+runCount
5. Reverse the rest of the scaling step, decrement w_current by 1.
6. Save w_current and w_other back into their corresponding weights and repeat for the next indexes.
7. Insert the current selected Index into the w_current child node index list.

It is noted that step 4 in the example above, reverses the scaling for the current weight (w_current). The weight scaling function and the reverse weight scaling function utilize an encoder and a decoder, which can correspond to the encoder/decoder module 116, for example. In some embodiments, the encoder/decoder module 116 can be implemented using a three-stage numerical binary encoder, as shown in FIG. 3, for example.

Figure 3:
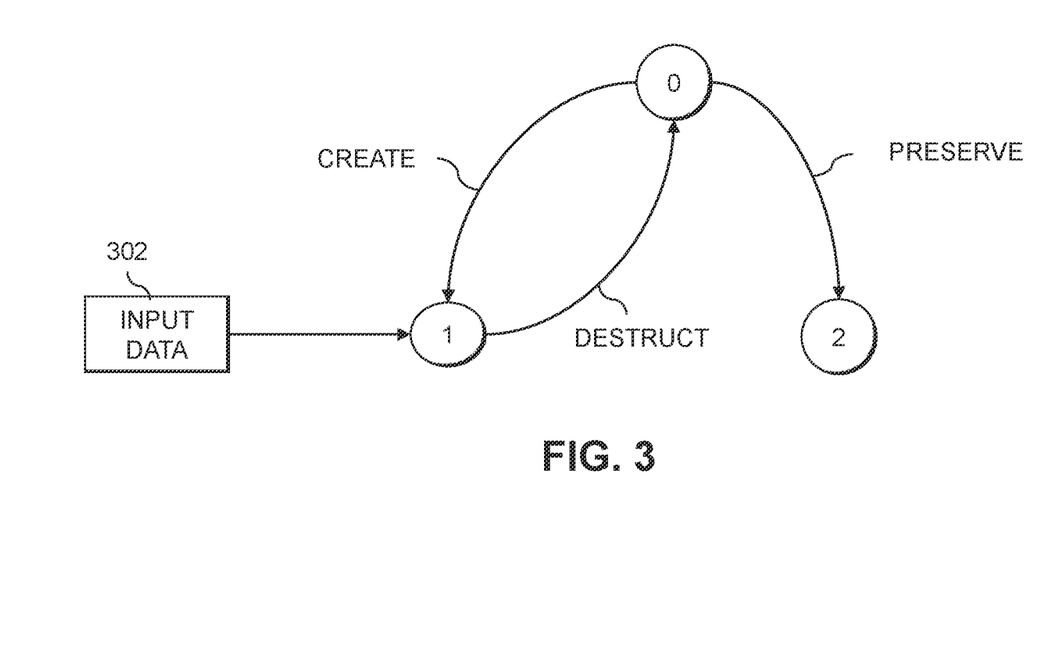
FIG. 3 shows stages of a numerical binary encoder in accordance with an illustrative embodiment.

In the FIG. 3 example, the three-stage numerical binary encoder includes a destruction stage (stage 0), a creation stage (stage 1), and a preservation stage (stage 2) for processing input data 302 (e.g., corresponding to one or more integers in order).

During the destruction stage, the logarithmic base 2 (log 2) of a current intermediate reference value is calculated. This results in a log 2 value corresponding to the count of bits in its binary representation.

The log 2 value calculated in stage 0 is then used in stage 1 (the creation stage) where the log 2 value is paired with incoming scaling information using square numbers, since they have a gap of 2*n and thus are efficient in storing the order of the integer pairs. This generates the next intermediate value. Stage 2 (the preservation stage) then computes a remainder by subtracting the log 2 value raised to the power of 2, from the initial intermediate reference value. This remainder is then preserved (e.g., to a file) using the same log 2 number of bits calculated in the destruction stage. The next intermediate value that is generated by the creation stage is assigned back to the reference value so that the next intermediate value becomes the current intermediate reference value, and then the cycle continues.

As another example, the following pseudocode can be used for implementing an encoder function in accordance with an illustrative embodiment.

1. Let runInput=Input Integer, intermediate Value=current intermediate reference value.
2. Set intermediate ValueIndex=floor (log 2 (intermediate Value+2)).
3. Set intermediate ValueRemainder=(intermediate Value+2−(1<<intermediate ValueIndex)).
4. Decrement intermediate ValueIndex by 1.
5. Set order=intermediate ValueIndex>=runInput.
6. Set large=Larger of intermediate ValueIndex and runInput.
7. Set small=Smaller of intermediate ValueIndex and runInput.
8. Set intermediate Value=large*large+ (order? small: large+large-small).
9. Write intermediate ValueRemainder to file with intermediate ValueIndex+1 number of bits.
10. Goto Step 1 for the next integer.

In some embodiments, a similar set of steps can be applied for a decoder process, in reverse, to extract the current scaling information from the output bits, and then to readjust the intermediate reference value to extract the next scaling information. As a non-limiting example, the following pseudocode can be used for implementing a decoder function in accordance with an illustrative embodiment.

1. Let intermediate Value=current intermediate reference value, runOutput=Output Integer.
2. Set squareIndex=floor(sqrt(intermediate Value)).
3. Set squareRemainder=intermediate Value−squareIndex*squareIndex.
4. Set order=squareIndex>=squareRemainder.
5. Set large=squareIndex.
6. Set small=order? squareRemainder: squareIndex+squareIndex−squareRemainder.
7. Set intermediate ValueIndex=order? large: small.
8. Set runOutput=order? small: large.
9. Read intermediate ValueIndex+1 number of bits from the file into intermediate ValueRemainder.
10. Increment intermediate ValueIndex by 1.
11. Readjust intermediate Value using intermediate ValueIndex and intermediate ValueRemainder:
    intermediate Value=(1<<intermediate ValueIndex)−2+intermediate ValueRemainder.
12. Return runOutput.
13. Goto Step 1 for the next integer.

Figure 4:
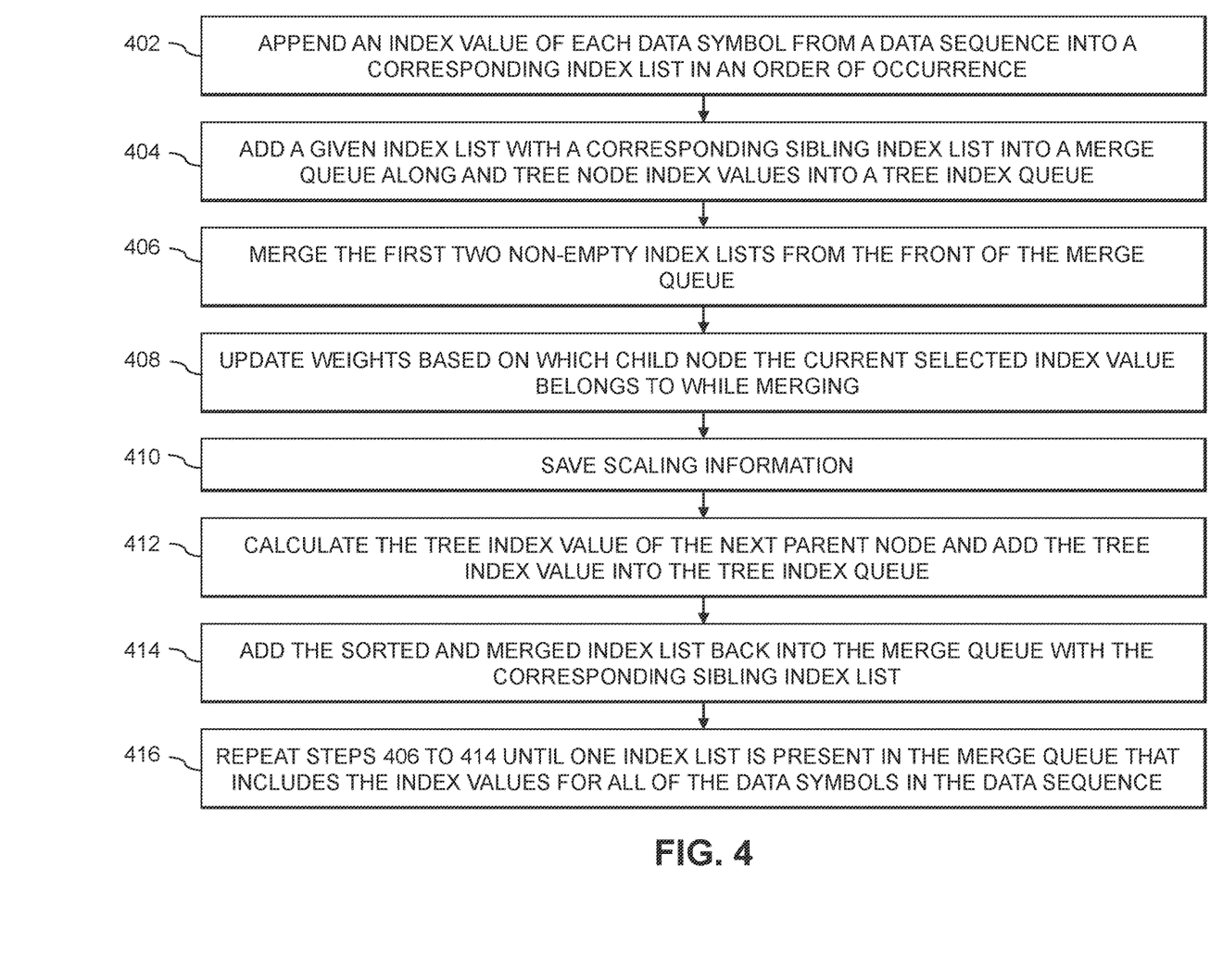
FIG. 4 shows a flow diagram for a sort-based compressor in an illustrative embodiment.

Referring now to FIG. 4, a flow diagram for a sort-based compressor is shown in an illustrative embodiment. It is to be understood that this particular process is only an example, and additional or alternative processes can be carried out in other embodiments.

In this embodiment, the process includes steps 402 through 416. These steps are assumed to be performed at least in part by the compression/decompression module 114 of the sort-based data compression system 105.

Step 402 includes appending an index value of each data symbol from a data sequence into a corresponding index list in an order of occurrence. Accordingly, step 402 can generate multiple index lists, where each index list indicates positions of instances of a same data symbol.

Step 404 includes adding a given index list with a corresponding sibling index list into a merge queue and tree node index values into a tree index queue. It is noted that if the sibling index list is empty, it is still added to the merge queue in order to satisfy a tree data structure, for example. In some embodiments, the tree node index values can be calculated by adding a padding value to all the data symbols so that the resulting symbols all lie in the same level of the tree data structure, for accurate convergence into a single parent node.

Step 406 includes merging the first two non-empty index lists from the front (or head) of the merge queue.

Step 408 includes updating weights based on which child node the current selected index value belongs to while merging. The weights can be updated based on the weight scaling function described above, for example.

Step 410 includes saving scaling information. For example, the scaling information may be generated by the weight scaling function when updating the weights in step 408.

Step 412 includes calculating the tree index value of the next parent node and adding the tree index value of the next parent node into the tree index queue. In some embodiments, the tree index value of the next parent node can be calculated based on the relationship between the child node index value and the corresponding parent node tree index value, depending on the indexing system used for the merge sort tree structure.

Step 414 includes adding the sorted and merged index list back into the merge queue with the corresponding sibling index list.

Step 416 includes repeating steps 406 to 414 until one index list is present in the merge queue that includes the index values for all of the data symbols in the data sequence.

The process depicted in FIG. 4 can optionally include a preprocessing step to sort the input data. For example, the preprocessing step can include using a block sorting process (such as a Burrows-Wheeler transform (BWT)) on the input data. This can increase the orderliness of the input data in a reversible way without added cost in terms of space.

Figure 5:
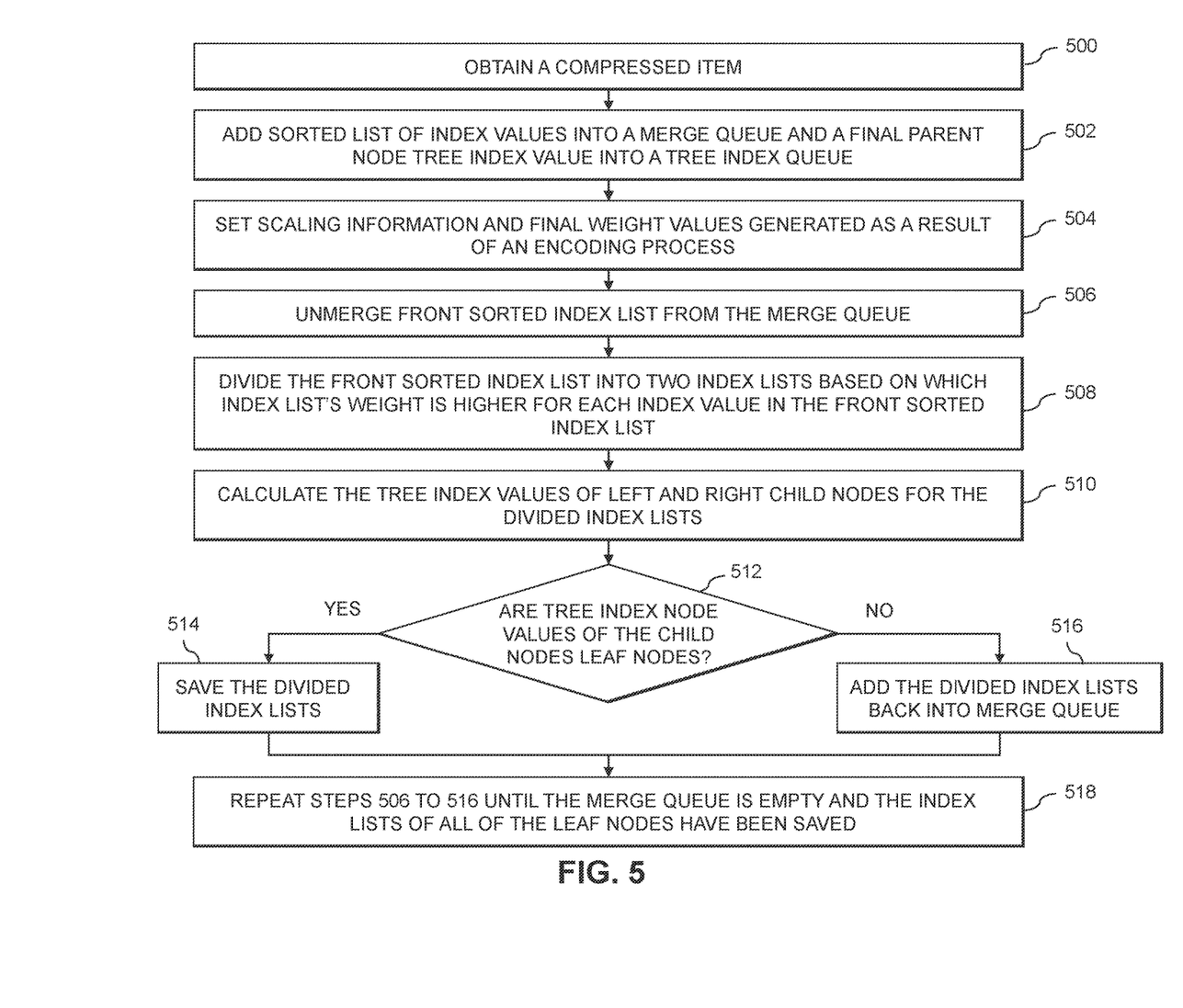
FIG. 5 shows a flow diagram for a sort-based decompressor in an illustrative embodiment.

In some embodiments, the data can then be decompressed based on the final index list and the metadata (scaling information and weight information) generated by the process depicted in FIG. 4 using the sort-based decompressor process depicted in FIG. 5, for example.

FIG. 5 shows a flow diagram for a sort-based decompressor in an illustrative embodiment. In this embodiment, the process includes steps 500 through 516. These steps are assumed to be performed at least in part by the compression/decompression module 114 of the sort-based data compression system 105.

Step 500 includes obtaining a compressed item. The compressed item can include, for example, a tree index value of the parent node where the index values converged into a single list during the compression process in FIG. 4, for example. The compressed item can also include, for example, other metadata such as scaling information, selection information, a size of the sequence of data, a data symbol set size, and/or at least some of the weight values determined for the nodes in the compression process in FIG. 4. It is noted that the single list of sorted list index values need not be included, as it can be generated (e.g., on the fly) using, for example, the file size metadata included in the compressed item during decompression.

Step 502 includes adding a sorted list of index values into a merge queue and a final parent node tree index value into a tree index queue.

Step 504 includes setting scaling information and final weight values generated as a result of an encoding process (e.g., performed by the encoder/decoder module 116).

Step 506 includes unmerging the front sorted index list from the merge queue. The front sorted index list can be unmerged based on the scaling information and the final weight values set in step 504, for example.

Step 508 includes dividing the front sorted index list into two index lists based on which index list's weight is higher for each index value in the front sorted index list.

Step 510 includes calculating the tree index values of left and right child nodes for the divided index lists. In some embodiments, step 510 corresponds to the reverse of the calculation used in step 412, for example.

Step 512 includes a test to determine if the tree index node values of the child nodes are leaf nodes. If the result of step 512 is yes, then step 514 is performed, which includes saving the divided index lists.

If the result of step 512 is no, then step 516 is performed, which includes adding the divided index lists back into the merge queue.

Step 518 includes repeating steps 506 to 516 until the merge queue is empty and the index lists of all the leaf nodes have been saved.

In at least some embodiments, the encoding process can optionally include a step of generating a security key (or token) to secure the compressed data. In such embodiments, the security key can be generated based on, for example, states of the weights that are maintained during the sort-based encoding process. For example, to reverse the merge sort operation, the state of the weights following each node being merged can be used, namely, 2*n−1 pairs of weights (which is the same as the total number of nodes). In another embodiment, a single pair of weights can be chained across all the nodes (e.g., in a BFS manner). In such an embodiment, the compressed output can be secured by generating a key by maintaining multiple weights corresponding to the multiple nodes of the merge sort tree, as opposed to a single pair of weights. The key (corresponding to the weight values) can be reconnected to specific nodes during the start of the decompression in the reverse sort process. This advantageously supports concurrent decompression at every level as each node will have its own unique pair of weights.

Figure 6:
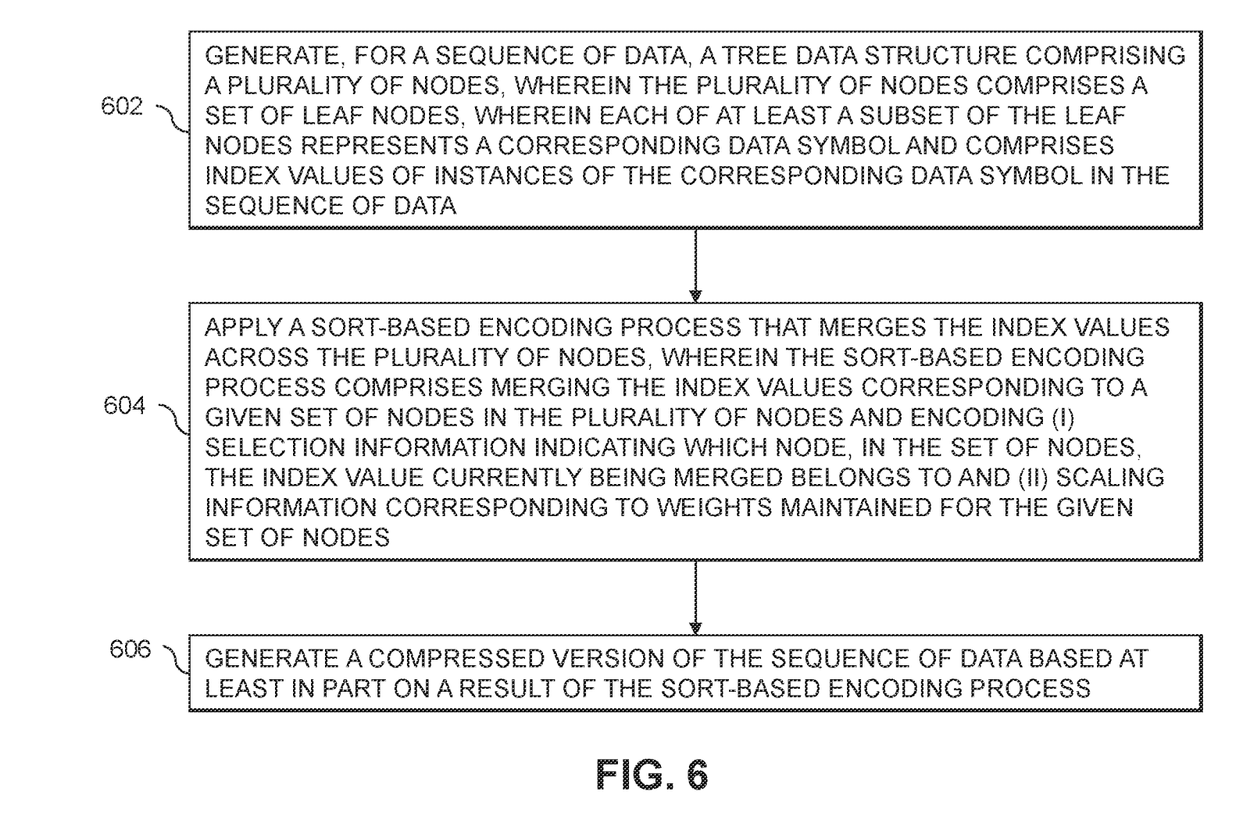
FIG. 6 shows a flow diagram of a process for data compression using a sort-based binary encoder in an illustrative embodiment.

FIG. 6 is a flow diagram of a process for data compression using a sort-based binary encoder in an illustrative embodiment. It is to be understood that this particular process is only an example, and additional or alternative processes can be carried out in other embodiments.

In this embodiment, the process includes steps 602 through 606. These steps are assumed to be performed by the sort-based data compression system 105 utilizing its elements 112, 114 and 116.

Step 602 includes generating, for a sequence of data, a tree data structure comprising a plurality of nodes, wherein the plurality of nodes comprises a set of leaf nodes, wherein each of at least of a subset of the leaf nodes represents a corresponding data symbol and comprises index values of instances of the corresponding data symbol in the sequence of data.

Step 604 includes a sort-based encoding process that merges the index values across the plurality of nodes, wherein the sort-based encoding process comprises merging the index values corresponding to a given set of nodes in the plurality of nodes and encoding (i) selection information indicating which node, in the set of nodes, the index value currently being merged belongs to and (ii) scaling information corresponding to weights maintained for the given set of nodes.

Step 606 includes generating a compressed version of the sequence of data based at least in part on a result of the sort-based encoding process.

The compressed version of the sequence of data may include a tree index value indicating a position of the node in the tree data structure corresponding to a sorted list of the index values, the encoded scaling information, and the encoded selection information. In some embodiments, the compressed version of the sequence of data can also include other metadata for decompressing the compressed version of the sequence of data, such as a size of the sequence of data, a data symbol set size, and/or the weights used in the encoding. The process may include a step of outputting the compressed version of the sequence of data to at least one device, where the at least one device decompresses the compressed version of the sequence of data based at least in part on the encoded selection information and the encoded scaling information. In some embodiments, the at least one device can generate the compressed version of the sequence of data and then decompress the compressed version at a later time, for example. The compressed version can alternatively or additionally be output to a separate device, for example. The sort-based encoding process may include applying a numerical binary encoder. Merging the index values corresponding to the given set of nodes may include applying a merge sort process. The process may include a step of processing, prior to generating the tree data structure, the sequence of input data at least in part by applying a block sorting process, and applying a value-to-index transformation to generate the index values for the input sequence of data. The sort-based encoding process may include determining that the index value currently being merged corresponds to a first node of the set of nodes and that a previously merged index value corresponds to a second node of the set of nodes, and setting the weight of the first node to a higher value than the weight of each of the other nodes in the set of nodes. The process may include a step of generating a key based at least in part on a state of the weights during at least a portion of the sort-based encoding process, and securing the compressed version of the sequence of data based at least in part on the generated key. Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve data compression. These and other embodiments can effectively overcome problems associated with existing testing techniques that often are not suitable for compressing different types of data and/or data having a high degree of sortedness. For example, some embodiments are configured to implement a sort-based binary encoder framework that extracts and compresses a distribution of data symbols in a data source by sorting the indexes of the symbols, and then encoding the distribution information. These and other embodiments can effectively compress different types of data with high compression ratios relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
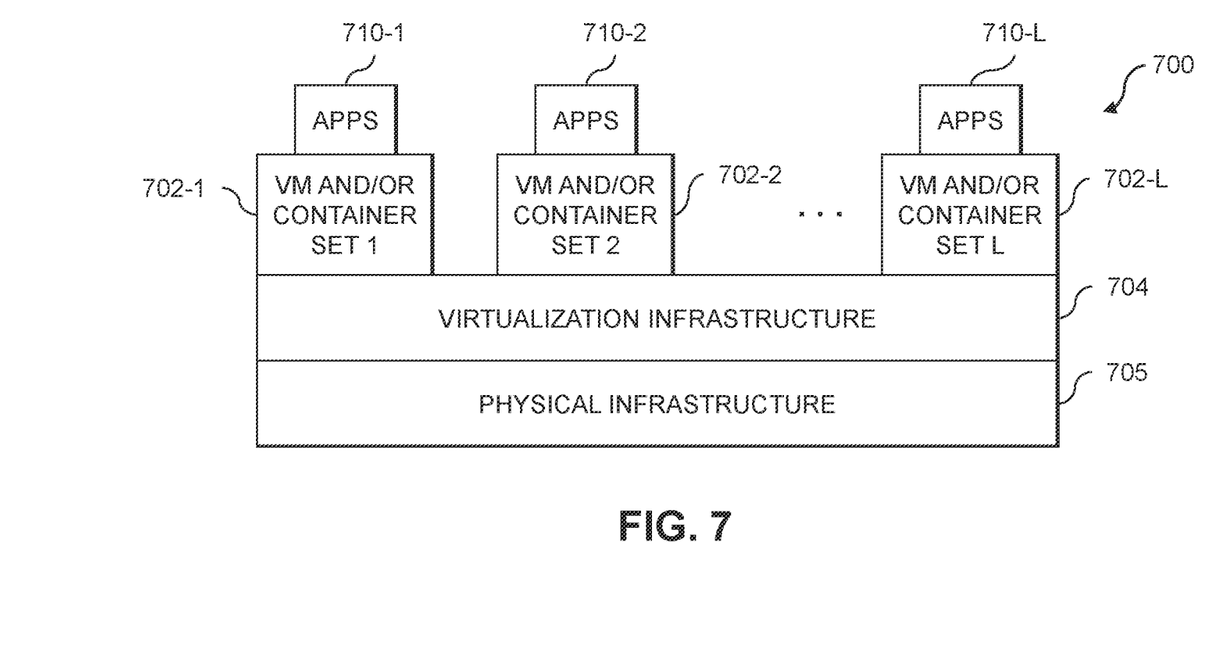
FIGS. 7 and 8 show examples of processing platforms that may be utilized to implement at least a portion of an information processing system in illustrative embodiments.
Figure 8:
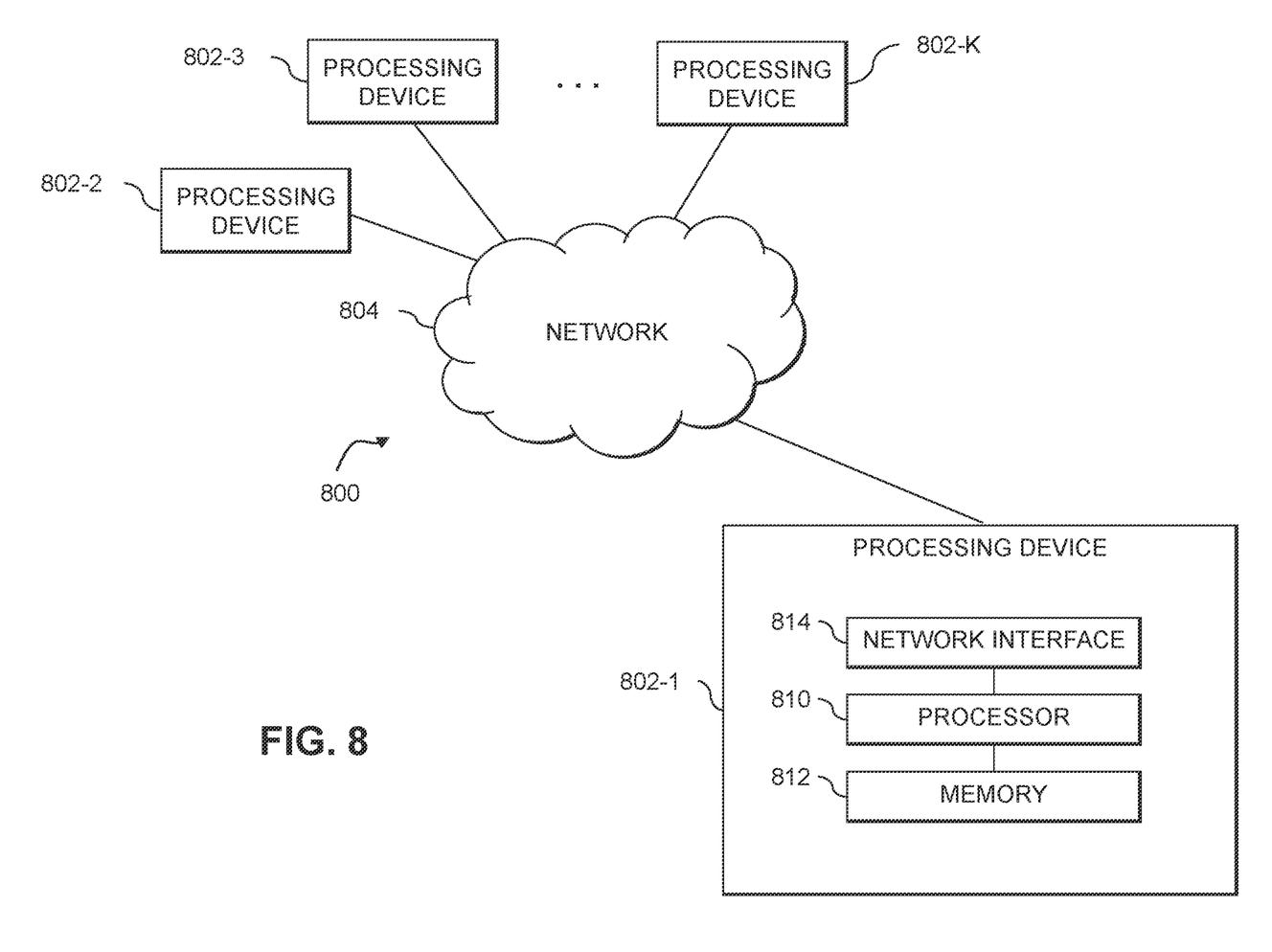

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an ASIC, an FPGA or other type of processing circuitry, as well as portions or combinations of such circuitry elements.

The memory 812 comprises RAM, ROM or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   generating, for a sequence of data, a tree data structure comprising a plurality of nodes, wherein the plurality of nodes comprises a set of leaf nodes, wherein each of at least a subset of the leaf nodes represents a corresponding data symbol and comprises index values of instances of the corresponding data symbol in the sequence of data;
   applying a sort-based encoding process that merges the index values across the plurality of nodes, wherein the sort-based encoding process comprises merging the index values corresponding to a given set of nodes in the plurality of nodes and encoding: (i) selection information indicating which node, in the given set of nodes, the index value currently being merged belongs to, and (ii) scaling information corresponding to weights maintained for the given set of nodes, and wherein encoding the scaling information is performed in response to determining that the index value currently being merged originates from a different node than a previously merged index value and comprises: (i) calculating the scaling information as a difference between the weights of the nodes and (ii) scaling the weights of the nodes to be equal; and
   generating a compressed version of the sequence of data based at least in part on a result of the sort-based encoding process;
   wherein the method is performed by at least one processing device comprising a processor coupled to a memory.

2. The computer-implemented method of claim 1, wherein the compressed version of the sequence of data comprises:
   a tree index value indicating a position of the node in the tree data structure corresponding to a sorted list of the index values;
   the encoded scaling information; and
   the encoded selection information.

3. The computer-implemented method of claim 1, comprising:
   outputting the compressed version of the sequence of data to at least one other processing device, wherein the at least one other processing device decompresses the sequence of data based at least in part on the encoded selection information and the encoded scaling information.

4. The computer-implemented method of claim 1, wherein the sort-based encoding process comprises applying a numerical binary encoder.

5. The computer-implemented method of claim 1, wherein the merging the index values corresponding to the given set of nodes comprises applying a merge sort process.

6. The computer-implemented method of claim 5, further comprising:
   processing, prior to generating the tree data structure, the sequence of input data at least in part by applying a block sorting process; and
   applying a value-to-index transformation to generate the index values for the sequence of data.

7. The computer-implemented method of claim 1, further comprising:
   generating a key based at least in part on a state of the weights during at least a portion of the sort-based encoding process; and
   securing the compressed version of the sequence of data based at least in part on the generated key.

8. The computer-implemented method of claim 1, wherein the sort-based encoding process further comprises, for each index value currently being merged, initially incrementing the weight of the node from which the index value originates.

9. A non-transitory processor-readable storage medium having stored therein program code of one or more software programs, wherein the program code when executed by at least one processing device causes the at least one processing device:
   to generate, for a sequence of data, a tree data structure comprising a plurality of nodes, wherein the plurality of nodes comprises a set of leaf nodes, wherein each of at least a subset of the leaf nodes represents a corresponding data symbol and comprises index values of instances of the corresponding data symbol in the sequence of data;
   to apply a sort-based encoding process that merges the index values across the plurality of nodes, wherein the sort-based encoding process comprises merging the index values corresponding to a given set of nodes in the plurality of nodes and encoding: (i) selection information indicating which node, in the given set of nodes, the index value currently being merged belongs to, and (ii) scaling information corresponding to weights maintained for the given set of nodes, and wherein encoding the scaling information is performed in response to determining that the index value currently being merged originates from a different node than a previously merged index value and comprises: (i) calculating the scaling information as a difference between the weights of the nodes and (ii) scaling the weights of the nodes to be equal; and to generate a compressed version of the sequence of data based at least in part on a result of the sort-based encoding process.

10. The non-transitory processor-readable storage medium of claim 9, wherein the compressed version of the sequence of data comprises:
a tree index value indicating a position of the node in the tree data structure corresponding to a sorted list of the index values;
the encoded scaling information; and
the encoded selection information.

11. The non-transitory processor-readable storage medium of claim 9, wherein the program code when executed by the at least one processing device further causes the at least one processing device:
to output the compressed version of the sequence of data to at least one other processing device, wherein the at least one other processing device decompresses the sequence of data based at least in part on the encoded selection information and the encoded scaling information.

12. The non-transitory processor-readable storage medium of claim 9, wherein the sort-based encoding process comprises applying a numerical binary encoder.

13. The non-transitory processor-readable storage medium of claim 9, wherein the merging the index values corresponding to the given set of nodes comprises applying a merge sort process.

14. The non-transitory processor-readable storage medium of claim 13, wherein the program code when executed by the at least one processing device further causes the at least one processing device:
to process, prior to generating the tree data structure, the sequence of input data at least in part by applying a block sorting process; and
to apply a value-to-index transformation to generate the index values for the sequence of data.

15. The non-transitory processor-readable storage medium of claim 9, wherein the sort-based encoding process further comprises, for each index value currently being merged, initially incrementing the weight of the node from which the index value originates.

16. An apparatus comprising:
at least one processing device comprising a processor coupled to a memory;
the at least one processing device being configured:
to generate, for a sequence of data, a tree data structure comprising a plurality of nodes, wherein the plurality of nodes comprises a set of leaf nodes, wherein each of at least a subset of leaf nodes represents a corresponding data symbol and comprises index values of instances of the corresponding data symbol in the sequence of data;
to apply a sort-based encoding process that merges the index values across the plurality of nodes, wherein the sort-based encoding process comprises merging the index values corresponding to a given set of nodes in the plurality of nodes and encoding: (i) selection information indicating which node, in the given set of nodes, the index value currently being merged belongs to, and (ii) scaling information corresponding to weights maintained for the given set of nodes, and wherein encoding the scaling information is performed in response to determining that the index value currently being merged originates from a different node than a previously merged index value and comprises: (i) calculating the scaling information as a difference between the weights of the nodes and (ii) scaling the weights of the nodes to be equal; and
to generate a compressed version of the sequence of data based at least in part on a result of the sort-based encoding process.

17. The apparatus of claim 16, wherein the compressed version of the sequence of data comprises:
a tree index value indicating a position of the node in the tree data structure corresponding to a sorted list of the index values;
the encoded scaling information; and
the encoded selection information.

18. The apparatus of claim 16, wherein the compressed version of the sequence of data comprises:
wherein the at least one processing device is further configured:
to output the compressed version of the sequence of data to at least one other processing device, wherein the at least one other processing device decompresses the sequence of data based at least in part on the encoded selection information and the encoded scaling information.

19. The apparatus of claim 16, wherein at least one of:
the sort-based encoding process comprises applying a numerical binary encoder; and
the merging the index values corresponding to the given set of nodes comprises applying a merge sort process.

20. The apparatus of claim 16, wherein the scaling information is encoded in response to the index value currently being merged corresponding to a first node in the given set of nodes, which is different from a second node in the given set of nodes corresponding to a previously merged index value.

* * * * *